US012647823B2

(12) United States Patent
Kuo et al.

(10) Patent No.: US 12,647,823 B2
(45) Date of Patent: Jun. 2, 2026

(54) TECHNOLOGIES FOR DYNAMIC CONTROL OF PROTOCOL DATA UNIT SET DISCARDING

(71) Applicant: Apple Inc., Cupertino, CA (US)

(72) Inventors: Ping-Heng Kuo, London (GB); Ralf Rossbach, Munich (DE); Sudeep Manithara Vamanan, Nuremberg (DE)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 18/414,378

(22) Filed: Jan. 16, 2024

(65) Prior Publication Data

US 2024/0284253 A1     Aug. 22, 2024

Related U.S. Application Data

(60) Provisional application No. 63/446,282, filed on Feb. 16, 2023.

(51) Int. Cl.
*H04W 76/20*        (2018.01)
*H04W 28/06*        (2009.01)
*H04W 8/22*         (2009.01)
*H04W 80/02*        (2009.01)

(52) U.S. Cl.
CPC .................................. *H04W 28/06* (2013.01)

(58) Field of Classification Search
CPC ....... H04W 28/06; H04W 76/20; H04W 8/22; H04W 80/02
USPC ........................................................ 709/238
See application file for complete search history.

(56) References Cited

U.S. PATENT DOCUMENTS

| | | | |
|---|---|---|---|
| 2016/0164793 A1 | 6/2016 | Basu Mallick et al. | |
| 2019/0124564 A1 | 4/2019 | Bathwal et al. | |
| 2019/0254117 A1 | 8/2019 | Chen et al. | |
| 2020/0221434 A1 | 7/2020 | Sun et al. | |
| 2021/0006644 A1 | 1/2021 | Yang et al. | |
| 2021/0329515 A1* | 10/2021 | Sharma ................. | H04W 80/02 |
| 2022/0182896 A1 | 6/2022 | Talebi Fard et al. | |

FOREIGN PATENT DOCUMENTS

| | | |
|---|---|---|
| CN | 103109490 A | 5/2013 |
| JP | 2011142602 A | 7/2011 |
| WO | 2022081073 A1 | 4/2022 |
| WO | 2022099586 A1 | 5/2022 |

(Continued)

OTHER PUBLICATIONS

3GPP TR 23.700-60 V1.2.0, 3rd Generation Partnership Project; Technical Specification Group Services and System Aspects; Study on XR (Extended Reality) and media services (Release 18), Oct. 2022, 266 pages.

(Continued)

*Primary Examiner* — Jude Jean Gilles
(74) *Attorney, Agent, or Firm* — Kilpatrick Townsend & Stockton LLP

(57) ABSTRACT

The present application relates to devices and components including apparatuses, systems, computer-readable media, and methods for dynamic control of protocol data unit set discarding. Embodiments include detecting a trigger event based on receipt of a media access control control element and switching between protocol data unit set discarding states based on the trigger event.

20 Claims, 8 Drawing Sheets

100

(56)                    References Cited

FOREIGN PATENT DOCUMENTS

| WO | 2024026736 A1 | 2/2024 |
| WO | 2024026744 A1 | 2/2024 |

OTHER PUBLICATIONS

Consideration on PDU Discarding of XR Traffic, 3 Generation Partnership Project Technical Specification Group-Radio Access Network Working Group 2 Meeting #120, R2-2212702, Nov. 14-18, 2022, 4 pages.

Discussion on PDU Discard for XR Awareness, 3 Generation Partnership Project Technical Specification Group-Radio Access Network Working Group2 #120 meeting, R2-2212537, Nov. 14-18, 2022, 4 pages.

Packet Discarding and Reordering Enhancements in XR, 3 Generation Partnership Project Technical Specification Group-Radio Access Network Working Group 2 Meeting #120, R2-2211720, Nov. 14-18, 2022, 5 pages.

International Patent Application No. PCT/US2024/011593, International Search Report and Written Opinion, Apr. 25, 2024, 16 pages.

PDU Set Integrated Packet Handling for XR and Media Service, Lenovo, TSG SA WG2 Meeting #150E, S2-2202682, Apr. 6-12, 2022, 4 pages.

Radio Quality Information Report Triggering, Ericsson, 3GPP TSG-RAN WG3 Meeting #101bis, R3-186074, Oct. 8-12, 2018, 5 pages.

Study on XR (Extended Reality) and Media Services, 3GPP TR 23.700-60 V0.1.0, Feb. 2022, 16 pages.

International Patent Application No. PCT/CN2022/109991, International Search Report and Written Opinion, Dec. 22, 2022, 9 pages.

International Patent Application No. PCT/CN2022/110050, International Search Report and the Written Opinion, Dec. 20, 2022, 9 pages.

3rd Generation Partnership Project; Technical Specification Group Radio Access Network; NR; Study on XR enhancements for NR (Release 18), 3GPP TR 38.835 V1.0.0, Dec. 2022, 121 pages.

3rd Generation Partnership Project; Technical Specification Group Services and System Aspects; Study on XR (Extended Reality) and media services (Release 18), 3GPP TR 23.700-60 V18.0.0, Dec. 2022, 266 pages.

LS Reply on QoS support with PDU Set granularity, 3GPP TSG-WG SA4 Meeting #118E, S4-220505, Apr. 6-14, 2022, 4 pages.

3rd Generation Partnership Project; Technical Specification Group Services and System Aspects; Traffic Models and Quality Evaluation Methods for Media and XR Services in 5G Systems (Release 18), 3GPP TR 26.926 V1.3.0, Nov. 2022, 56 pages.

3GPP TR 23.700-60 V0.3.0, 3rd Generation Partnership Project; Technical Specification Group Services and System Aspects; Study on XR (Extended Reality) and media services (Release 18), May 2022, 217 pages.

3GPP TS 38.331 V17.1.0, 3rd Generation Partnership Project; Technical Specification Group Radio Access Network; NR; Radio Resource Control (RRC) Protocol Specification (Release 17), Jun. 2022, 1273 pages.

KI#4 and #5, Baseline for PDU Set based QoS Framework, 3rd Generation Partnership Project Technical Specification Group—Working Group SA2 Meeting #151E, S2-2205074, May 16-20, 2022, 5 pages.

International Patent Application No. PCT/CN2022/109991, International Preliminary Report on Patentability, Feb. 13, 2025, 5 pages.

International Patent Application No. PCT/CN2022/110050, International Preliminary Report on Patentability, Feb. 13, 2025, 5 pages.

International Patent Application No. PCT/US2024/011593, International Preliminary Report on Patentability, Aug. 28, 2025, 11 pages.

* cited by examiner

300

Oct 1

| D_0 | D_1 | D_2 | D_3 | D_4 | D_5 | D_6 | D_7 |

Configuring UE with first/second PDU-set discarding states
604

Trigger condition detected?
608

No

Yes

Transmitting switch command to UE
612

TECHNOLOGIES FOR DYNAMIC CONTROL OF PROTOCOL DATA UNIT SET DISCARDING

CROSS-REFERENCE TO RELATED APPLICATION

This application claims the benefit of U.S. Provisional Patent Application No. 63/446,282, filed Feb. 16, 2023. The disclosure of this application is incorporated by reference herein in its entirety.

TECHNICAL FIELD

This application relates generally to the field of wireless network and, in particular to technologies for dynamic control of protocol data unit set discarding.

BACKGROUND

Third Generation Partnership Project (3GPP) Technical Specifications (TSs) define standards for wireless networks. These TSs describe aspects related to signaling extended reality (XR) traffic throughout systems that incorporate wireless networks.

BRIEF DESCRIPTION OF THE DRAWINGS

FIG. 4 illustrates a media access control-control element in accordance with some embodiments.

DETAILED DESCRIPTION

Figure 1:
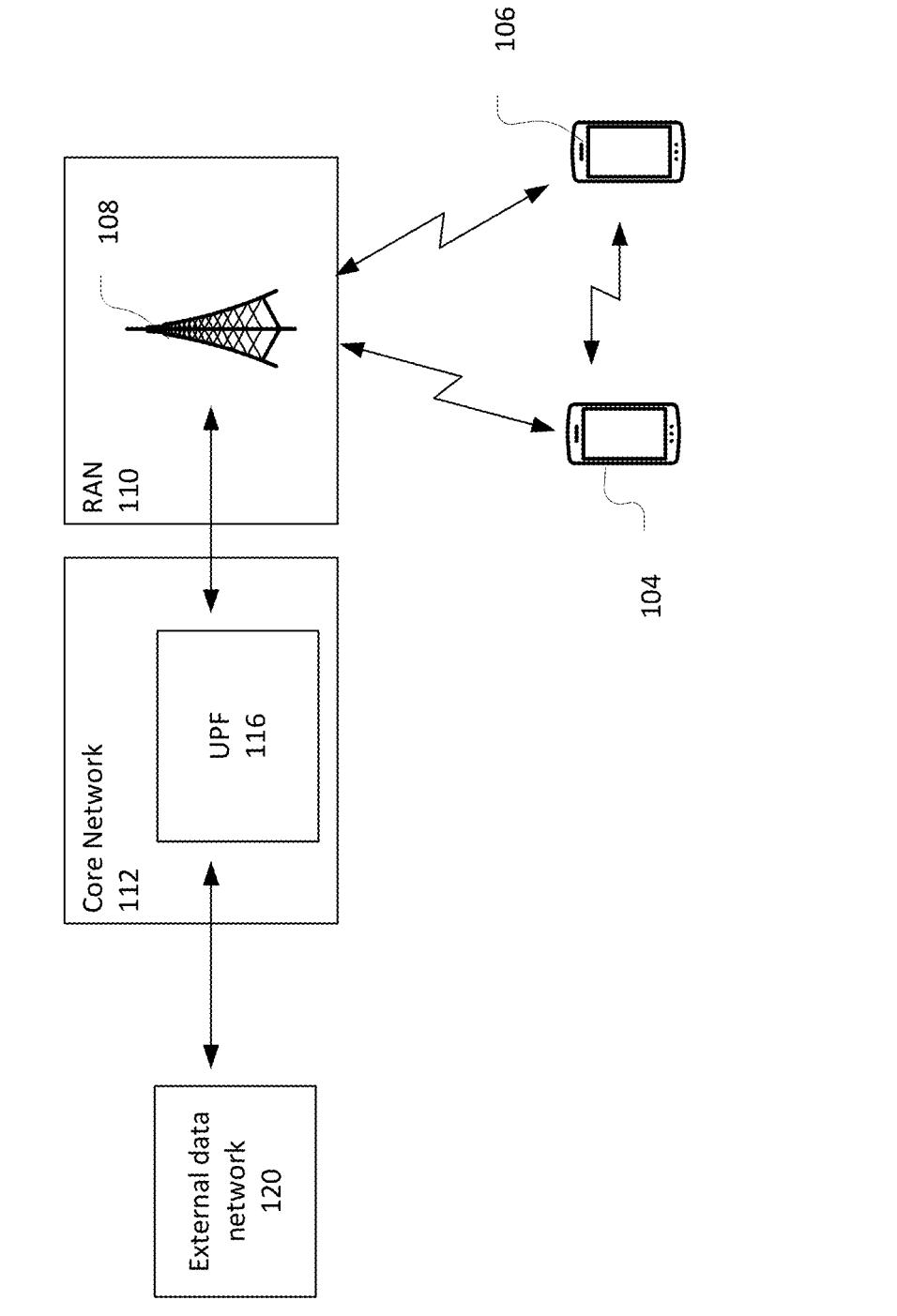
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "based on A" means "based at least in part on A." for example, it could be "based solely on A" or it could be "based in part on A."

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a user equipment (UE) 104 communicatively coupled with a base station 108 of a radio access network (RAN) 110. The UE 104 and the base station 108 may communicate over air interfaces compatible with 3GPP TSs such as those that define a Fifth Generation (5G) new radio (NR) system or a later system. The base station 108 may provide user plane and control plane protocol terminations toward the UE 104.

In some embodiments, the UE 104 and base station 108 may establish data radio bearers (DRBs) to support transmission of data over a wireless link between the two nodes.

In one example, these DRBs may be used for traffic from extended reality (XR) applications that contains a large amount of data conveying real and virtual images and audio for presentation to a user.

The network environment 100 may further include a core network 112. For example, the core network 112 may comprise a 5th Generation Core network (5GC) or later generation core network. The core network 112 may be coupled to the base station 108 via a fiber optic or wireless backhaul. The core network 112 may provide functions for the UE 104 via the base station 108. These functions may include managing subscriber profile information, subscriber location, authentication of services, or switching functions for voice and data sessions.

The core network 112 may include a user plane function (UPF) 116 that provides for routing and forwarding of user plane packets between the base station 108 and an external data network 120. The BS 108 may receive uplink packets from the UE 104 through the DRBs and may transmit the uplink packets to the UPF 116 through a general packet radio service (GPRS) tunneling protocol-user plane (GTP-U) tunnel. The UPF 116 may remove the packet headers and forward the packets to the external data network 120. The UPF 116 may map downlink packets arriving from an external data network onto specific quality of service (QOS) flows belonging to specific protocol data unit (PDU) sessions before forwarding to the BS 108. The BS 108 may map the traffic to the appropriate DRBs for delivery to the UE 104.

In some embodiments, the network environment 100 may also include UE 106. The UE 106 may be coupled with the UE 104 via a sidelink interface. In some embodiments, the UE 106 may act as a relay node to communicatively couple the UE 104 to the RAN 110. In other embodiments, the UE 106 and the UE 104 may represent end nodes of a communication link. For example, the UEs 104 and 106 may exchange data with one another.

Figure 2:
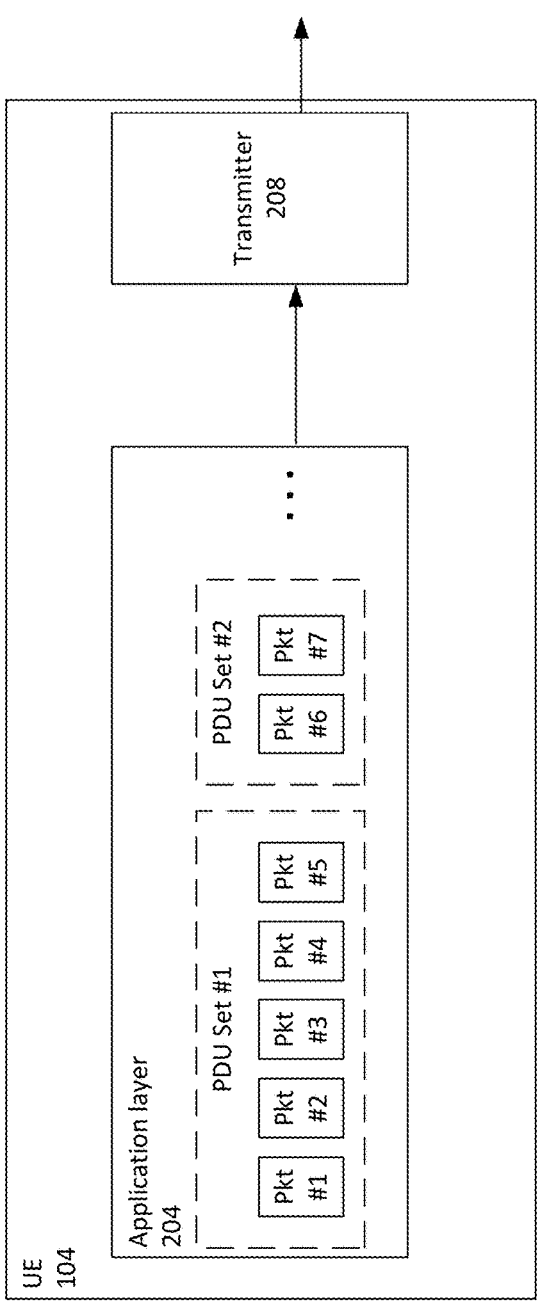
FIG. 2 illustrates a user equipment in accordance with some embodiments.

FIG. 2 illustrates aspects of the UE 104 in further detail in accordance with some embodiments. The UE 104 may include an application layer 204 that generates application traffic to be transmitted to another device through the network environment 100.

In some embodiments, the application layer 204 may have an XR application that generates XR traffic. However, embodiments are not limited to XR use cases.

For XR and other services, the application layer 204 may generate PDU sets, with individual PDU sets comprising one or more packets. A packet, which may also be referred to as a PDU, may be an Internet protocol (IP) packet or a non-IP packet. As shown, PDU set #1 may include packets #1-#5, while PDU set #2 includes packet #6 and #7. Each PDU set may be mapped to a different QoS flow.

The packets of a PDU set may carry a payload of one unit of information generated by the application layer. The unit of information may be a frame or video slice for XR Services such as those defined in 3GPP Technical Report (TR) 26.926 v1.3.0 (2022-November), for example. In some implementations all PDUs in the PDU Set may be needed by an application layer at a destination node to allow the application layer to recover parts or all of the information unit. In other implementations, the application layer on the destination node may still be able to recover parts or all of the information unit even if some PDUs of a PDU set are missing.

In some embodiments, the data produced by an application layer of the UE 104 may include multi-modal data. Multi-modal data may include input data from different kinds of devices/sensors or the output data to different kinds of destinations (e.g., one or more UEs) desired for the same task or application. Multi-modal data may include more than one single-modal data (e.g., one type of data), and there may be a strong dependency among each single-modal data associated with multi-modal data.

In some embodiments, the data produced by an application layer may be in a data burst. A data burst may include, for example, data produced by the application layer in a short period of time. The data burst may include PDUs from one or more PDU Sets.

The PDU sets may be provided to a transmitter 208 of the UE 104. The transmitter 208 may be configured to execute a communication protocol stack, for example, communication protocol stack 736 of FIG. 7, to facilitate communication via the network environment 100. The transmitter 208 may implement layer 2 (L2) and layer 1 (L1) functionality. At the L2 level, the transmitter 208 may include a service data adaptation protocol (SDAP) layer, a packet data convergence protocol (PDCP) layer, a radio link control (RLC) layer, and a media access control (MAC) layer. At the L1 level, the transmitter 208 may include a physical (PHY) layer. Briefly, the SDAP layer may manage QoS flow handling between the QoS flows and the DRBs. The PDCP layer may manage robust header (de)compression and security between DRBs and RLC channels. The RLC layer may manage (re-)segmentation and error correction through automatic repeat request (ARQ) between logical channels and RLC channels. The MAC layer may manage scheduling/ priority handling. (de)multiplexing, and hybrid automatic repeat request (HARQ) processes between logical channels and transport channels. And the PHY layer may manage the processing of the physical data and control channels.

In some embodiments, various information may be provided by the core network 112 to the RAN 110 to assist the handling of QoS flows and PDUs. This information may be consistent with that described in 3GPP TR 23.700-60 v18.0.0 (2022 Dec. 21). This information may include semi-static information for both uplink and downlink, PDU set QoS parameters, and dynamic information for downlink.

The semi-static information for both uplink and downlink may be provided via control plane (NGAP). This information may include periodicity for uplink and downlink traffic of the QoS Flow via time sensitive communications assistance information (TSCAI)/time sensitive communications assistance container (TSCAC); and traffic jitter information (e.g., jitter range) associated with each periodicity of the QoS flow.

The PDU set QoS parameters may include a PDU Set Error Rate (PSER) to define an upper bound for the rate of PDU Sets that have been processed by the sender of a link layer protocol but that are not successfully delivered by the corresponding receiver to the upper layer. See, for example, 3GPP TR 23.700-60. In some instances, a PDU set may be considered as successfully delivered when all PDUs of a PDU Set are delivered successfully. In other instances, other definitions of successful delivery may be made.

The PDU set QoS parameters may further include a PDU Set Delay Budget (PSDB) that defines a time between reception of a first PDU and successful delivery of a last-arrived PDU of a PDU Set. See, for example, 3GPP TR 23.700-60. The PSDB may be an optional parameter in various embodiments.

The PDU set QoS parameters may further include a PDU Set Integrated Indication (PSII) to indicate whether all PDUs are needed for usage of PDU Set by an application layer.

The dynamic information for DL may be provided by user plane (e.g., a GTP-U header). This information may include: a PDU set sequence number (SN): a PDU set size (in bytes): a PDU SN within a PDU Set: an end PDU of the PDU Set indication: a PDU set importance; and an end of data burst indication in the header of a last PDU of the data burst. The PDU set importance may be used to identify the importance of a PDU Set within a Qos flow. The RAN 110 may use the PDU set importance for PDU Set level packet discarding in presence of congestion as will be described herein.

In some embodiments, PDU set discarding may be employed by a transmitting device. The PDU set discarding may be similar to that described in 3GPP TR 38.835 v1.0.0 (2022 Dec. 6). For example, in some instances a threshold number of PDUs of a PDU set may be desired for a receiving application layer to use the unit of information. If a transmitting device determines, for example, the number of PDUs of a PDU set are lost exceeds the threshold number, the transmitting device may discard the remaining PDUs of the PDU set without transmission in order to free up radio resources. In some embodiments, a PDU may be determined to be lost if it is unsuccessfully transmitted (e.g., within a required time budget) or discarded before transmission. A PDU may be discarded as described herein or for other reasons, e.g., the PDU depends on another PDU that was lost.

In some instances, the network may configure the UE behavior of uplink PDU set discarding based on the PSII, which indicates whether all packets in the PDU set are needed for the usage of PDU set by the application layer. In particular, if the application cannot make use of a PDU set as soon as a threshold number of packets of the PDU set are lost, there may be no need to transmit further PDUs after determining the threshold number of packets of a PDU set are already lost. This facilities improvement of radio resource efficiency.

However, it may not always be the case that a receiving application layer is unable to use remaining PDUs after the threshold number of PDUs have been lost. This may depend on the application layer. Further, from an application layer perspective, due to heavy compression and spatial-temporal prediction, any packet losses in video data may result in a degradation. Thus, network transmissions procedures that reduce video packet losses may improve operation of video applications by allowing the video applications to employ more efficient/simple techniques while still maintaining desired levels of quality of experience.

Even if a PDU set can be "safely" discarded based on, e.g., the QoS information of PSII, reducing this type of discarding may improve user-perceived quality of experience. In some instances, the PSII may not have direct or decisive impact to the decision on whether PDU Set discarding should be configured, as there may be instances that benefit from the UE 104 performing PDU Set discarding regardless of whether the application needs all packets of a PDU set or not. For example, if an application needs all packets of a PDU set (e.g., PSII is set to TRUE), the UE 104 can discard the whole PDU Set as soon as a packet of the PDU Set is lost (as described in, e.g., TR 38.835). This may be especially useful when the network is congested. For another example, if an application does not need all packets of a PDU set (e.g., PSII is set to FALSE), the UE 104 may still be configured to apply PDU Set discarding to handle potential network congestion.

In any event, PDU Set discarding may be more beneficial when the network congested. When the network is not congested. PDU set discarding may be less useful as radio resource optimization may be relatively less important. And, as described above, excessive PDU Set discarding could have some adversarial impacts to user experience.

In some instances, the packet discarding based on PDU Set Importance may be specifically associated to network congestion status.

Embodiments of the present disclosure provide that network (e.g., RAN 110) may determine whether PDU Set Discarding behavior should be applied. This may be based on network congestion status. Given that the network congestion status may change, it May be desirable to enable dynamic control of PDU set discarding. This may allow the network to react to network congestion in a timely manner. Various embodiments describe how to dynamically activate/deactivate uplink PDU set discarding at the UE 104.

Figure 3:
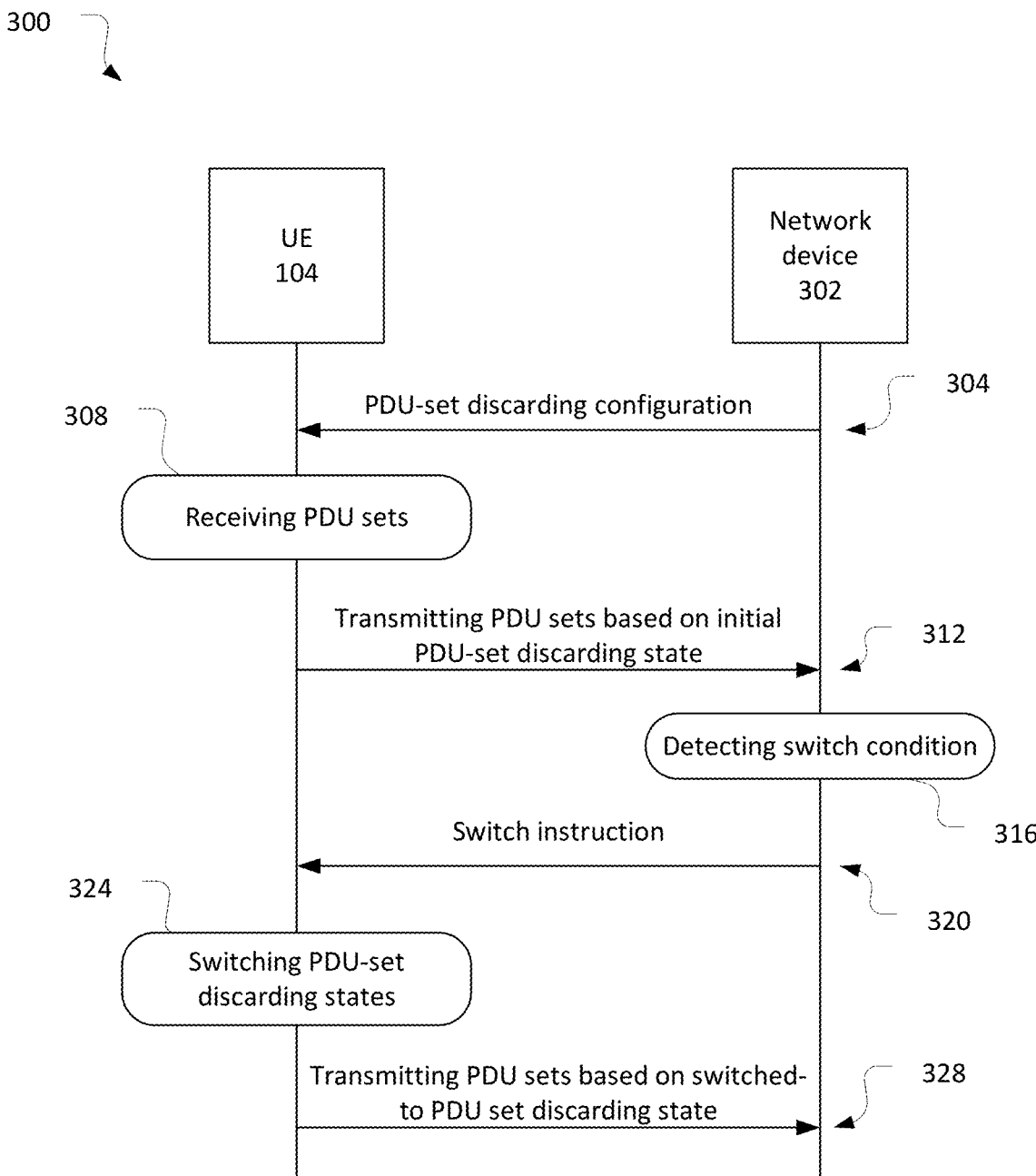
FIG. 3 illustrates a signaling diagram in accordance with some embodiments.

FIG. 3 illustrates a signaling diagram 300 to describe dynamic switching of PDU-set discarding behavior in accordance with a first aspect of this disclosure.

The signaling diagram 300 may include operations and signals between UE 104 and network device 302. The network device may be a device of the RAN 110 (e.g., base station 108) or another UE, e.g., UE 106. In some embodiments, the network device 302 may represent an aggregation of devices including, for example, the UE 106 and the base station 108.

The signaling diagram 300 may include, at 304, the base station 108 providing PDU-set discarding configuration to the UE 104. In some embodiments, the PDU set discarding configuration may configure one or more PDU-set discarding states corresponding to a DRB. For example, in one embodiment, the two PDU-set discarding states may be configured for a DRB. A first state may have PDU-set discarding activated. For example, while in the first state, the UE 104 may discard a whole PDU set when one or more PDUs in the PDU set are known to be lost. A second state may have PDU-set discarding deactivated. For example, while in the second state, the UE 104 does not discard a whole PDU set when one or more PDUs in the PDU set are known to be lost.

In some embodiments, the PDU-set discarding states may be preconfigured (or configured by earlier signaling) and the transmission of the configuration at 304 may configure whether the UE 104 is to activate PDU-set discarding for UL transmission on a DRB. This indication may be a binary flag indication in a configuration element such as, for example, a PDCP configuration (pdcp-config) information element (IE).

In some embodiments, the PDU-set discarding configuration may also provide an indication of which of state of the configured states is to be an initial (or default) state that sets the PDU-set discarding behavior for the DRB. For example, this indication may indicate whether or not the UE 104 should apply PDU-set discarding (either from an immediate PDU set or a following PDU set) on a DRB once the DRB is configured by RRC.

The signaling diagram 300 may further include, at 308, the UE 104 receiving PDU sets. The PDU sets may be received by lower layers of the UE 104 (e.g., transmitter 208) from upper layers (e.g., application layer 204). The PDU sets may be part of a traffic flow.

At 312, the UE 104 may transmit the PDU sets based on the initial PDU-set discarding state. For example, if the PDU-set discarding state has PDU set discarding activated for a DRB, the UE 104 may discard the whole PDU set when one or more PDUs in the PDU set are determined to be lost. If the PDU-set discarding state has PDU-set discarding deactivated, the UE 104 may not discard the whole PDU set when one or more PDUs in the PDU set are determined to be lost. In this case, the UE 104 may continue to transmit the PDUs of a particular PDU set regardless of the number of PDUs lost.

The signaling diagram 300 may further include, at 316, the network device 302 detecting a switch condition. In some embodiments, the switch condition may be based on network congestion. The switch condition may be further based on the PDU-set discarding state in which the UE 104 is currently operating for a given DRB. For example, if the UE 104 is operating with PDU set discarding activated for a DRB, the switch condition may be when the network congestion falls below a first predetermined threshold. And, if the UE 104 is operating with PDU set discarding deactivated for a DRB, the switch condition may be when the network congestion rises above a second predetermined threshold. The first/second predetermined thresholds may be the same value or different values.

After detecting the switch condition at 316, the network device 302 may transmit a switch instruction to the UE 104 to dynamically switch the state of PDU set discarding behavior the UE 104 applies with respect to a DRB. The switch instruction May cause the UE 104 to switch from operating in a first PDU-set discarding state to a second PDU-set discarding state. For example, the switch instruction may cause the UE 104 to activate PDU set discarding (if previously deactivated) or deactivate PDU set discarding (if previously activated).

Figure 4:
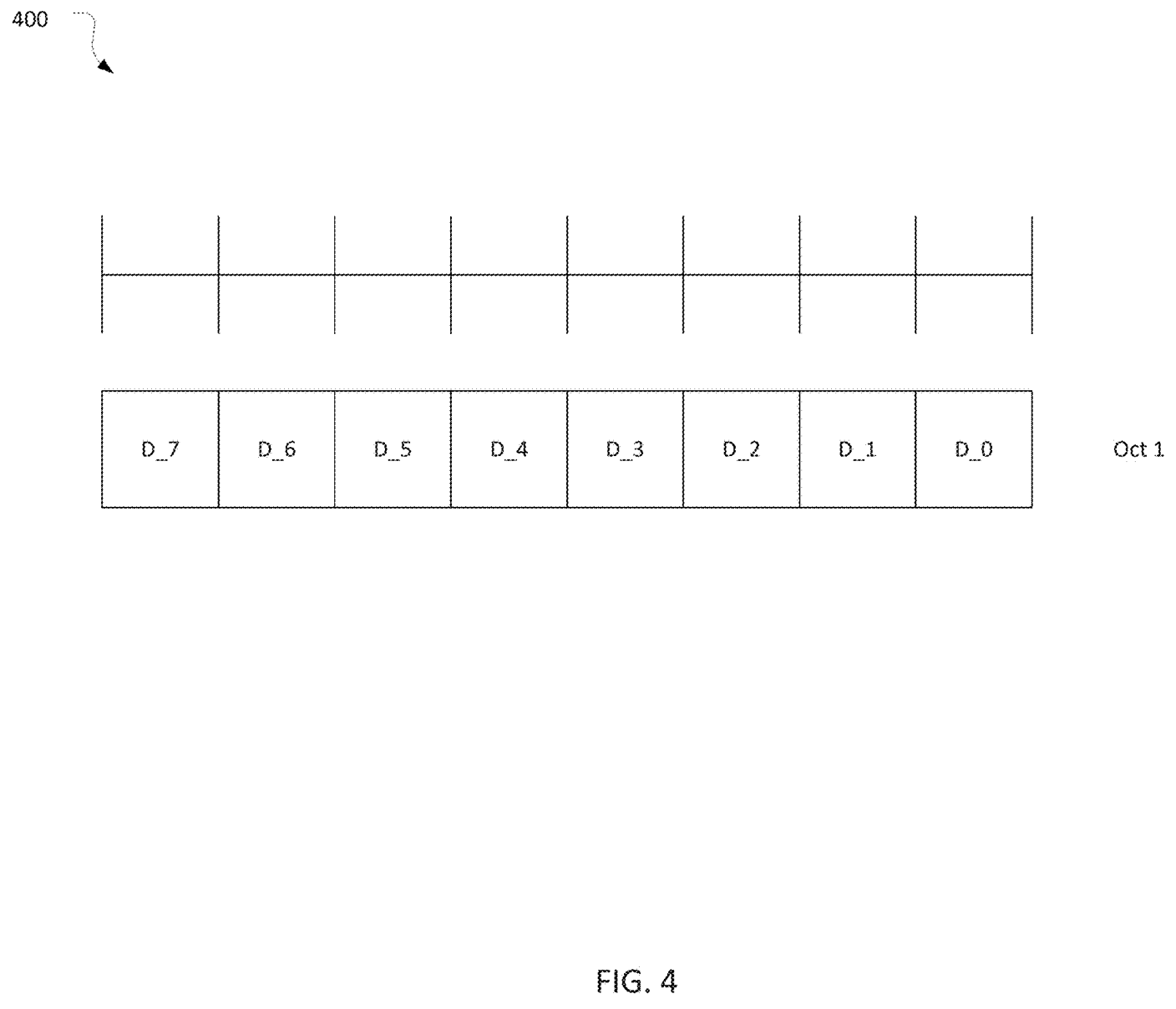

In some embodiments, the trigger command 320 may be a MAC CE. FIG. 4 illustrates a MAC CE that may be used to convey a switch instruction for switching PDU-set discarding states in accordance with some embodiments. In this embodiments, the MAC CE 400 may include a bitmap in which each bit is associated with a DRB. The value of a particular bit may indicate whether the UE 104 should operate in a first PDU-set discarding state or a second PDU-set discarding state for an associated DRB. For example, a bit May have a value of '0' to indicate PDU set discarding should be deactivated for an associated DRB and may have a value of '1' to indicate PDU set discarding should be activated for an associated DRB. These values may differ in other embodiments.

In another embodiment, the MAC CE may convey a switch instruction by including one or more DRB identifiers (IDs). Upon receiving this switch instruction, the UE 104 may determine that it is to switch PDU-set discarding states with respect to each of the DRBs associated with IDs in the MAC CE.

While some embodiments describe the PDU-set discarding states applying to particular DRBs, other embodiments may have the PDU-set discarding states applying to a QoS flow or a particular RLC entity (e.g., per logical channel (LCH)).

In some instances, a plurality of RLC entities may be associated with a DRB and individual RLC entities may be configured with respective PDU-set discarding states. In this case, the MAC CE conveying the switch instruction may include: a DRB ID and a bitmap describing the PDU Set discarding behavior for each of multiple RLC entities associating with the DRB corresponding to the DRB ID. The bitmap may activate/deactivate PDU set discarding similar to that described above.

Upon receiving the switch instructions, the UE 104 may switch PDU-set discarding states at 324. And, at 328, the UE 104 may transmit PDU sets based on the switched-to PDU-set discarding state.

A second aspect of the disclosure provides for discarding that is specific to PDU-set types.

In general, the same signaling framework associated with the first aspect (e.g., signaling diagram 300) may be associated with the second aspect. For example, the network may initially configure whether UL transmission on a DRB may have "PDU set discarding" behavior. This could be, e.g., a binary-flag indication in a pdcp-config IE. The network may further configure an initial state of PDU-Set discarding behavior of the DRB. For instance, this may indicate whether or not the UE 104 should directly apply PDU Set discarding (either starting from the immediate PDU Set or the following PDU Set) on a particular DRB once configured by the RRC. And the network may dynamically switch the state of PDU Set discarding behavior of the DRB by, e.g., a MAC CE. For example, when network congestion occurs, the network may send the dynamic control signal to activate PDU-set discarding in at least one DRB in order to save radio resource.

According to the second aspect, an importance level of a PDU set may be relevant when determining PDU-set discarding behavior. For example, when PDU Set discarding is activated for a DRB, for an important PDU set, the UE 104 does not discard the whole PDU set even if one or more PDUs in the PDU set are determined to be lost. When PDU Set discarding is activated for a DRB, for a non-important PDU set, the UE 104 discards the whole PDU set if one or more PDUs in the PDU set are determined to be lost. When PDU-set discarding is deactivated for a DRB, the UE 104 may treat all PDU sets the same, regardless of importance. In this case, the UE 104 does not discard the whole PDU set even if one or more PDUs in the PDU Set are known to be lost.

Similar to the first aspect, apart from DRB, the PDU set discarding may be defined for specific types on per QoS-Flow basis or per RLC entity basis (e.g., per LCH).

Further, while above embodiments describe the importance level associated with the PDU sets serving the basis for the differentiated PDU-set discarding behavior, other embodiments may rely on other PDU set characteristics (e.g., PSER, PSDB).

A third aspect of the disclosure provides for direct discarding of non-important PDU sets.

In general, the same signaling framework associated with the first aspect (e.g., signaling diagram 300) may be associated with the third aspect. For example, the network may initially configure whether UL transmission on a DRB may have "PDU Set discarding" behavior. This could be, e.g., a binary-flag indication in a pdcp-config IE. The network may further configure an initial state of PDU-Set discarding behavior of the DRB. For instance, this may indicate whether or not the UE 104 should directly apply PDU Set discarding (either starting from the immediate PDU Set or the following PDU Set) on a particular DRB once configured by the RRC. And the network may dynamically switch the state of PDU Set discarding behavior of the DRB by, e.g., a MAC CE. For example, when network congestion occurs, the network may send the dynamic control signal to activate PDU-set discarding in at least one DRB in order to save radio resource.

According to the third aspect, an importance level of a PDU set may be relevant when determining PDU-set discarding behavior similar to the second aspect. For example, when PDU Set discarding is activated for a DRB, for an important PDU set, the UE 104 does not discard the whole PDU set even if one or more PDUs in the PDU set are determined to be lost. This may be similar to the second aspect. However, when PDU Set discarding is activated for a DRB, for a non-important PDU set, the UE 104 directly discards the whole PDU set when the PDU set arrives at the transmitter 208. This may be done without any attempt to send any packet of these PDU sets over the air interface.

And, similar to the second aspect, when PDU-set discarding is deactivated for a DRB, the UE 104 may treat all PDU sets the same, regardless of importance. In this case, the UE 104 does not discard the whole PDU set even if one or more PDUs in the PDU Set are known to be lost.

Similar to the first aspect, apart from DRB, the PDU set discarding may be defined for specific types on per QoS-Flow basis or per RLC entity basis (e.g., per LCH).

A fourth aspect of the disclosure provides for switching of triggering conditions for PDU-set discarding.

In general, the same signaling framework associated with the first aspect (e.g., signaling diagram 300) may be associated with the fourth aspect. For example, the network may initially configure whether UL transmission on a DRB may have "PDU Set discarding" behavior. This could be, e.g., a binary-flag indication in a pdcp-config IE. The network may further configure an initial state of PDU-Set discarding behavior of the DRB. For instance, this may indicate whether or not the UE 104 should directly apply PDU Set discarding (either starting from the immediate PDU Set or the following PDU Set) on a particular DRB once configured by the RRC. And the network may dynamically switch the state of PDU Set discarding behavior of the DRB by, e.g., a MAC CE.

According to the third aspect, the network may send the dynamic control signal (e.g., switch command) to change the triggering conditions for PDU-set discarding in at least one DRB. In this aspect, the different PDU-set discarding states may be associated with different threshold number of lost/delivered PDUs that triggers PDU set discarding.

For example, when the UE 104 is in a first PDU-discarding state, the UE 104 discards the whole PDU set when a first number of PDUs in the PDU set are determined to be lost. And, when the UE 104 is in a second PDU-discarding state, the UE 104 discards the whole PDU set when a second number of PDUs in the PDU set are determined to be lost. Thus, in this case, the different states correspond to different threshold levels of lost PDUs that trigger PDU-set discarding.

Similar to the first aspect, apart from DRB, the PDU set discarding of the fourth aspect may be defined for specific types on per QoS-Flow basis or per RLC entity basis (e.g., per LCH).

In some embodiments, the fourth aspect may be extended in a manner that the threshold number of lost/discarded PDUs that trigger PDU set discarding further depends on an importance level of the PDU set.

For example, when the UE 104 is in a first PDU-set discarding state for a DRB, for an important PDU Set, the UE 104 discards the whole PDU Set when a first number of PDUs in the PDU set are determined to be lost. And, when the UE 104 is in the first PDU-set discarding state for a DRB, for a non-important PDU Set, the UE 104 discards the whole PDU Set when a second number of PDUs in the PDU Set are determined to be lost.

When the UE 104 is in a second PDU-set discarding state for a DRB, the UE 104 may treat all the PDU sets the same, regardless of importance levels. In particular, the UE 104 discards the whole PDU set when a first number of PDUs in the PDU set are determined to be lost.

A fifth aspect of the disclosure provides for switching of discard timer values. A discard timer may control the time a PDU set resides in a buffer. A discard timer may be associated with each PDU of a PDU set. The discard timer may start when the PDU enters the buffer. If a discard timer of any PDU of a PDU set expires, the PDU set may be determined to be stale and any remaining PDUs may be discarded without attempting further transmissions. Thus, the discard timer may be used to limit the amount of time a PDU set resides in a buffer.

In general, the same signaling framework associated with the first aspect (e.g., signaling diagram 300) may be associated with the fifth aspect. For example, the network may initially configure whether UL transmission on a DRB may have "PDU Set discarding" behavior. This could be, e.g., a binary-flag indication in a pdcp-config IE.

With the fifth aspect, the network may configure a primary discard timer value and a secondary discard timer value. The discard timer values may be associated with a PDCP service data unit (SDU) or a plurality of PDCP SDUs (e.g., a PDU set). When a PDCP SDU arrives at a PDCP layer, the PDCP layer may perform various operations on the PDCP SDU, e.g., add headers, and output a PDU. When a PDCP SDU arrives at a transmission buffer, an associated discard timer may start. In some embodiments, if the timer expires before the corresponding PDU is transmitted, the UE 104 may determine the PDU (and also an associated PDU set in some embodiments) is to be discarded.

With this aspect, the different PDU-set discarding states may use the different discard timer values. The network may dynamically switch the state of PDU set discarding behavior of the DRB by, e.g., a MAC CE. By dynamically switching the state, the network may switch use of the primary and secondary discard timer values at the UE 104.

When the UE 104 is operating in the first PDU-set discarding state for a DRB, the UE 104 discards the whole PDU Set based on the primary discard timer value. For example, a PDCP SDU is discarded if it is not delivered when its associated discard timer expires, wherein the timer is based on a primary timer value. When the PDCP SDU is discarded, the rest of the PDCP SDUs of the PDU set may also be discarded.

When the UE 104 is operating in the second PDU-set discarding state for the DRB, the UE 104 discards the whole PDU Set based on the secondary discard timer value. For example, a PDCP SDU is discarded if it is not delivered when its associated discard timer expires, wherein the timer is based on the secondary timer value. When the PDCP SDU is discarded, the rest of the PDCP SDUs of the PDU set may also be discarded.

Similar to the first aspect, apart from DRB, the PDU set discarding of the fifth aspect may be defined on per QoS-Flow basis or per RLC entity basis (e.g., per LCH).

In some embodiments, the fifth aspect may be extended such that the discard timer value may further depend on an importance level of a PDU Set.

For example, when the UE 104 is in the first PDU-set discarding state for a DRB, for an important PDU set, the UE 104 discards the whole PDU Set based on the primary discard timer value. When the UE 104 is in the first PDU-set discarding state for a DRB, for a non-important PDU set, the UE 104 discards the whole PDU Set based on the secondary discard timer value.

When the UE 104 is in the second PDU-set discarding state for a DRB, the UE 104 may treat all the PDU sets the same, regardless of importance levels. In particular, the UE 104 discards the whole PDU set based on the primary discard timer value.

A sixth aspect of the disclosure provides for the signaling and use of UE assistance information (UAI) with respect to PDU set discarding. For example, the UE 104 may transmit UAI to a network device (e.g., the base station 108). The UAI may include an indication of a preference of the UE 104 with respect to PDU-set discarding behavior. Some examples of UAI may be provided as follows. These examples are not mutually exclusive and may be used in combination with various other examples.

In a first example, the UAI may indicate whether the UE 104 would like to activate or de-activate PDU set discarding on one or more DRBs/RLCs/QOS Flows.

In a second example, the UAI may indicate which PDU-set discarding state the UE 104 would prefer with respect to one or more DRBs/RLCs/QOS Flows.

In a third example, the UAI may indicate triggering conditions for PDU set discarding behavior the UE 104 would like to apply for one or more DRBs/RLCs/QOS Flows. For example, the triggering conditions may include first/second threshold numbers of packets as described above with respect to the fourth aspect.

In a fourth example, the UAI may indicate which discard timer value for PDU set discarding the UE 104 would like to apply for one or more DRBs/RLCs/QOS Flows.

While the above examples are provided with respect to the preference of the UE 104 (e.g., the transmitting UE), other examples may provide UAI that is from, or relates to, the receiving UE. For example, capabilities or preferences of the receiving UE may be provided to the network device as UAI.

Upon the reception of the UAI described above, the network device may perform one or more of the following operations.

The network device may evaluate whether the PDU set discarding behavior could/should be configured in accordance with the preference expressed by the UAI. If the PDU set discarding behavior could/should be configured in the requested manner, the network device may proceed to configure the PDU set discarding behavior in accordance with the preference of the UE 104. The network device may transmit a response message/signal to the UE 104 to indicate whether it would or would not configure the PDU set discarding behavior in accordance with the preference of the UE 104.

While various embodiments and aspects have been defined separately herein, some embodiments may implement various combinations of elements of these aspects/embodiments. In some of these combinations, the base station 108 may configure the UE 104 to switch among the behavior associating to two or more of the aspects described herein. According to a specific example, the UE 104 may be operating based on the first aspect, wherein it simply activates and deactivates PDU set discarding. At some point thereafter, the network may instruct the UE 104 to switch to operating according to the second aspect in which it further takes PDU set types (e.g., importance levels) into account for PDU Set discarding behavior. This disclosure does not preclude combination, or switching, among any of the described aspects.

Figure 5:
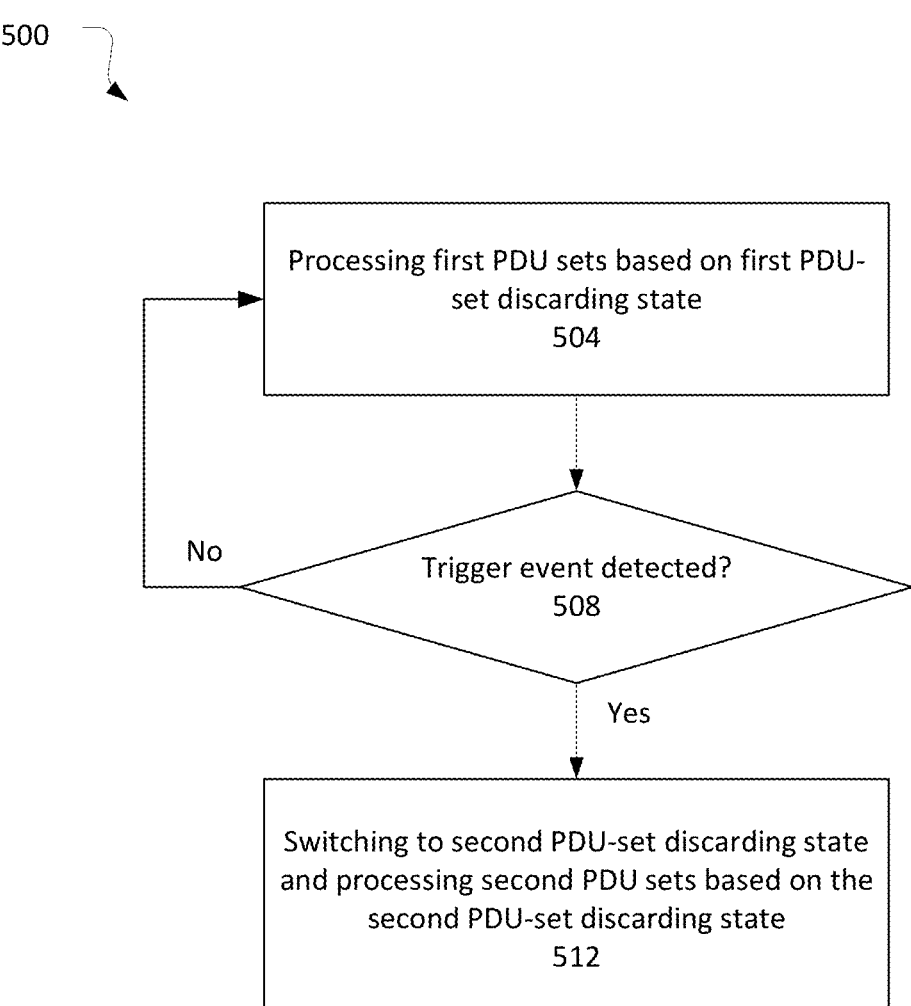
FIG. 5 illustrates an operational flow/algorithmic structure in accordance with some embodiments.

FIG. 5 is an operational flow/algorithmic structure 500 in accordance with some embodiments. The operational flow/algorithmic structure 500 may be performed by a UE such as UE 104, UE 700, or components thereof, for example, processors 704.

The operational flow/algorithmic structure 500 may include, at 504, processing first PDU sets based on a first PDU-set discarding state. The first PDU-set discarding state may be either the first or second states as described with respect to any of the aspects described herein. In some embodiments, the first PDU-set discarding state may be the state the network configures as an initial or default state in which the UE is to operate.

The operational flow/algorithmic structure 500 may further include, at 508, detecting a trigger event. In some embodiments, the trigger event detected may be receipt of a switch command. For example, a receipt of a MAC CE that instructs the UE to switch states for at least one DRB/QOS flow/RLC entity. The MAC CE may include a bitmap in which each bit corresponds to a DRB/QOS flow/RLC entity. In some embodiments, the MAC CE may include an identifier associated with a DRB/QOS flow/RLC entity.

Upon detection of the trigger condition at 508, the operational flow/algorithmic structure 500 may include, at 512, switching to a second PDU-set discarding state and processing second PDU sets based on the second PDU-set discarding state.

In some embodiments, a first one of the first or second PDU-set discarding states may include a state in which the UE discards PDU sets determined to have one or more PDUs lost; and a second one of the first or second PDU-set discarding states may include a state in which the UE continues to transmit PDUs of PDU sets of the second PDU sets determined to have one or more PDUs lost.

In some embodiments, a first one of the first or second PDU-set discarding states may include a state in which the UE transmits PDU sets determined to have a relatively high importance level (e.g., important PDU sets) and discards PDU sets determined to have a relatively low importance level (e.g., non-important PDU sets) and determined to have one or more PDUs lost.

In some embodiments, a first one of the first or second PDU-set discarding states may include a state in which the UE transmits PDU sets determined to have a relatively high importance level (e.g., important PDU sets) and discards PDU sets determined to have a relatively low importance level (e.g., non-important PDU sets). The relatively low importance sets may be discarded without attempting to transmit any PDUs.

In some embodiments, a first one of the first or second PDU-set discarding states may include a state in which the UE discards PDU sets determined to have a number of PDUs lost greater than a first number; and a second one of the first or second PDU-set discarding states may include a state in which the UE discards PDU sets determined to have a number of PDUs lost greater than a second number.

In some embodiments, a first one of the first or second PDU-set discarding states may include a state in which the UE discards PDU sets determined to have a first importance level (e.g., important PDU sets) and a number of PDUs lost greater than a first number; and discards PDU sets determined to have a second importance level (e.g., non-important PDU sets) and a number of PDUs lost greater than a second number. A second one of the first or second PDU-set discarding states may include a state in which the UE discards PDU sets having a number of PDUs lost greater than a first number irrespective of importance levels of the discarded PDU sets.

In some embodiments, a first one of the first or second PDU-set discarding states may include a state in which the UE discards PDU sets determined to reside in a buffer longer than a first predetermined length of time; and a second one of the first or second PDU-set discarding states may include a state in which the UE discards PDU sets determined to reside in the buffer longer than a second predetermined length of time. In some embodiments, residence time of a PDU set in a buffer may correspond to a longest residence time of any PDCP SDU that corresponds to a PDU of the PDU set. For example, if a discard timer for a PDCP SDU expires, then the whole PDU set with which the PDCP SDU is associated will be discarded in accordance with some embodiments.

In some embodiments, a first one of the first or second PDU-set discarding states may include a state in which the UE discards PDU sets determined to have a first importance level (e.g., important PDU sets) and reside in a buffer longer than a first predetermined length of time; and discards PDU sets determined to have a second importance level (e.g., non-important PDU sets) and reside in a buffer longer than a second predetermined length of time. And a second one of the first or second PDU-set discarding states may include a state in which the UE discards PDU sets determined to reside in the buffer longer than the first predetermined length of time irrespective of importance level.

Figure 6:
FIG. 6 illustrates another operational flow/algorithmic structure in accordance with some embodiments.
Figure 6:
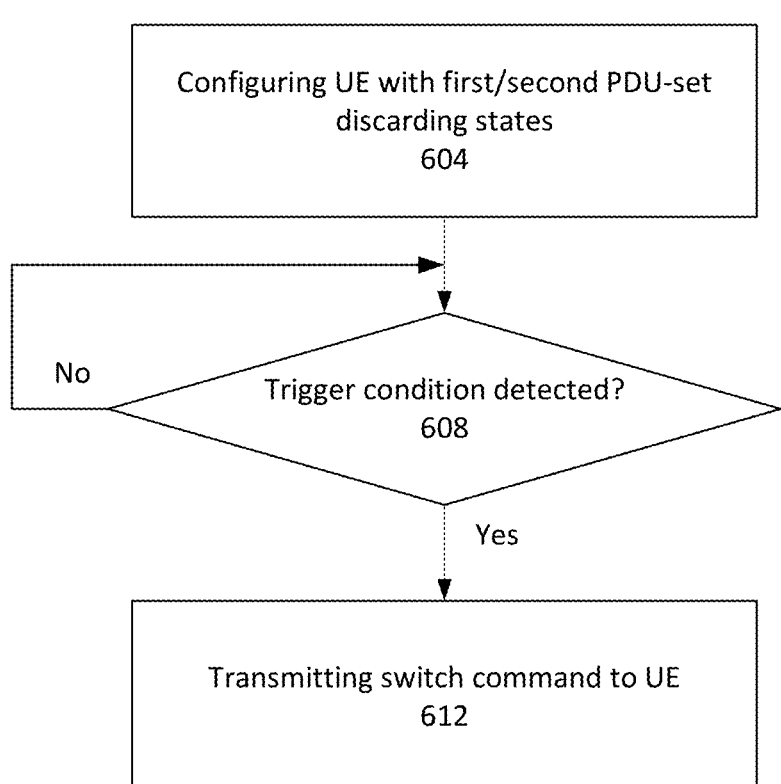

FIG. 6 is an operational flow/algorithmic structure 600 in accordance with some embodiments. The operational flow/algorithmic structure 600 may be performed by a network node such as UE 106, base station 108: or components thereof, for example, processors 604 or 804.

The operational flow/algorithmic structure 600 may include, at 604, configuring a UE with first/second PDU set discarding states. In some embodiments, the configuration may configure an initial (or default) state of the first/second PDU set discarding states. The configuration may additionally/alternatively configure aspects of the states (e.g., trigger conditions, threshold levels, discard timers, etc.).

In some embodiments, the network device may receive UAI and configure the PDU set discarding states based on the UAI. The UAI may indicate a preference for a particular configuration/parameter. For example, the UAI may indicate a preference to activate or deactivate PDU set discarding: a preference to apply a PDU-set discarding state: a preference to configure a trigger condition: or a preference to apply a discard timer value.

The operational flow/algorithmic structure 600 may further include, at 608, detecting a trigger condition. In some embodiments, the trigger condition may be the presence or absence of network congestion. Thresholds associated with presence or absence of network congestion may be the same or different.

Upon detection of the trigger condition at 608, the operational flow/algorithmic structure 600 may include, at 612, transmitting a switch command to the UE. The switch command may be a MAC CE that instructs the UE to switch states for at least one DRB/QOS flow/RLC entity. The MAC CE may include a bitmap in which each bit corresponds to a DRB/QOS flow/RLC entity. In some embodiments, the MAC CE may include an identifier associated with a DRB/QOS flow/RLC entity.

Figure 7:
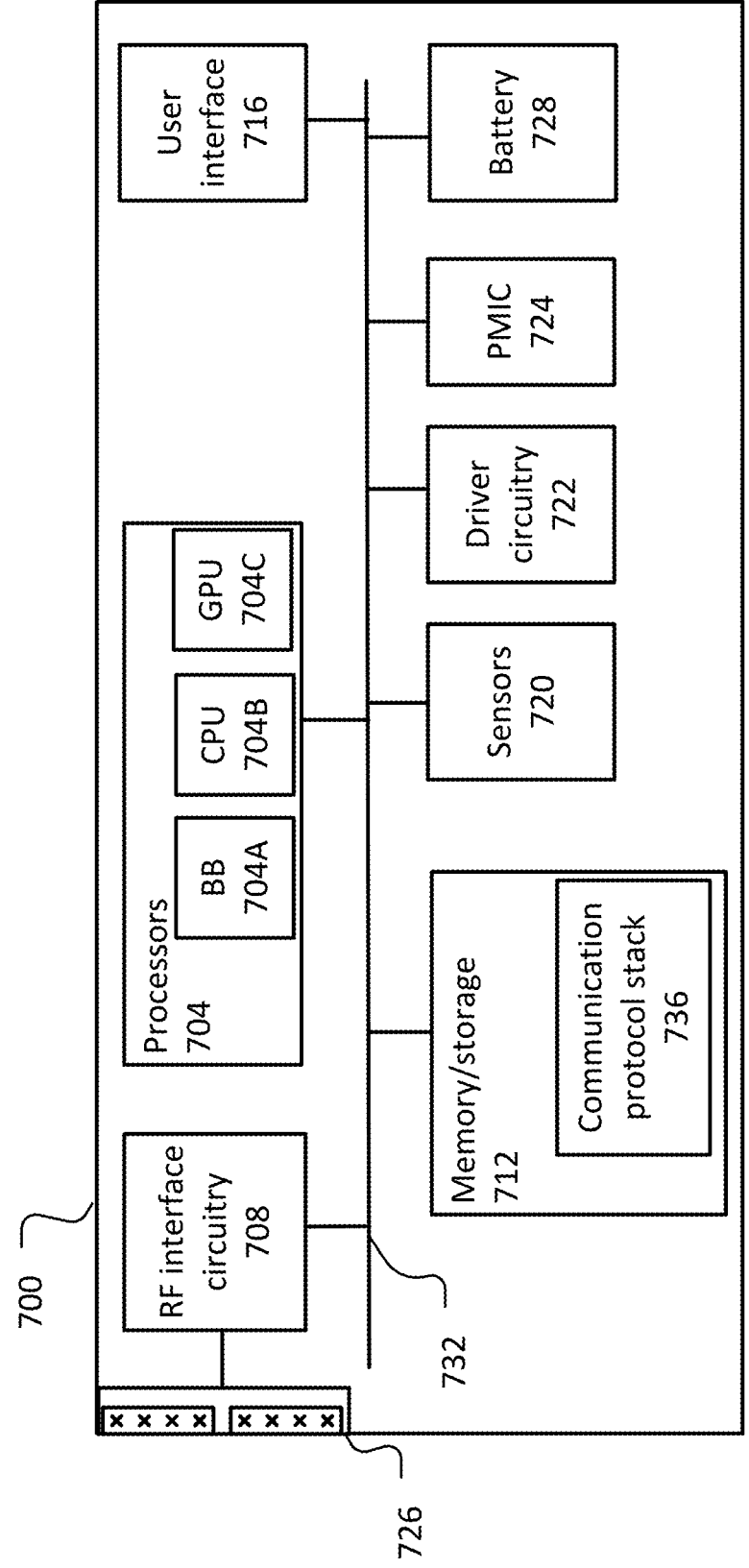
FIG. 7 illustrates a user equipment in accordance with some embodiments.

FIG. 7 illustrates an example UE 700 in accordance with some embodiments. The UE 700 may be any mobile or non-mobile computing device, such as, for example, a mobile phone, a computer, a tablet, an industrial wireless sensor (for example, a microphone, a carbon dioxide sensor, a pressure sensor, a humidity sensor, a thermometer, a motion sensor, an accelerometer, a laser scanner, a fluid level sensor, an inventory sensor, an electric voltage/current meter, or an actuators), a video surveillance/monitoring device (for example, a camera), a wearable device (for example, a smart watch), or an Internet-of-things (IoT) device.

The UE 700 may include processors 704, RF interface circuitry 708, memory/storage 712, user interface 716, sensors 720, driver circuitry 722, power management integrated circuit (PMIC) 724, antenna structure 726, and battery 728. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 732, which may represent any type of interface, input/output, bus (local, system, or expansion), transmission line, trace, optical connection, etc. that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the UE 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 712 may include one or more non-transitory, computer-readable media that includes instructions (for example, communication protocol stack 736) that may be executed by one or more of the processors 704 to cause the UE 700 to perform various operations described herein including, for example, operational flow/algorithmic structure 500. The memory/storage 712 include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 726.

In various embodiments, the RF interface circuitry 708 may be configured to transmit/receive signals in a manner compatible with NR access technologies.

The antenna structure 726 may include antenna elements to convert electrical signals into radio waves to travel through the air and to convert received radio waves into electrical signals. The antenna elements may be arranged into one or more antenna panels. The antenna structure 726 may have antenna panels that are omnidirectional, directional, or a combination thereof to enable beamforming and multiple-input, multiple-output communications. The antenna structure 726 may include microstrip antennas, printed antennas fabricated on the surface of one or more printed circuit boards, patch antennas, phased array antennas, etc. The antenna structure 726 may have one or more panels designed for specific frequency bands including bands in FR1 or FR2.

The user interface 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 700.

The sensors 720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers: microelectromechanical systems or nanoelectromechanical systems comprising 3-axis acceler-ometers, 3-axis gyroscopes, or magnetometers: level sensors: flow sensors: temperature sensors (for example, thermistors): pressure sensors: barometric pressure sensors: gravimeters: altimeters: image capture devices (for example, cameras or lensless apertures): light detection and ranging sensors: proximity sensors (for example, infrared radiation detector and the like): depth sensors: ambient light sensors: ultrasonic transceivers: microphones or other like audio capture devices: etc.

The driver circuitry 722 may include software and hardware elements that operate to control particular devices that are embedded in the UE 700, attached to the UE 700, or otherwise communicatively coupled with the UE 700. The driver circuitry 722 may include individual drivers allowing other components to interact with or control various input/output (I/O) devices that may be present within, or connected to, the UE 700. For example, driver circuitry 722 may include a display driver to control and allow access to a display device, a touchscreen driver to control and allow access to a touchscreen interface, sensor drivers to obtain sensor readings of sensors 720 and control and allow access to sensors 720, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the UE 700. In particular, with respect to the processors 704, the PMIC 724 may control power-source selection, voltage scaling, battery charging, or DC-to-DC conversion.

In some embodiments, the PMIC 724 may control, or otherwise be part of, various power saving mechanisms of the UE 700. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 700 may power down for brief intervals of time and thus save power. If there is no data traffic activity for an extended period of time, then the UE 700 may transition off to an RRC_Idle state, where it disconnects from the network and does not perform operations such as channel quality feedback, handover, etc. The UE 700 goes into a very low power state and it performs paging where again it periodically wakes up to listen to the network and then powers down again. The UE 700 may not receive data in this state: in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 728 may power the UE 700, although in some examples the UE 700 may be mounted deployed in a fixed location and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

Figure 8:
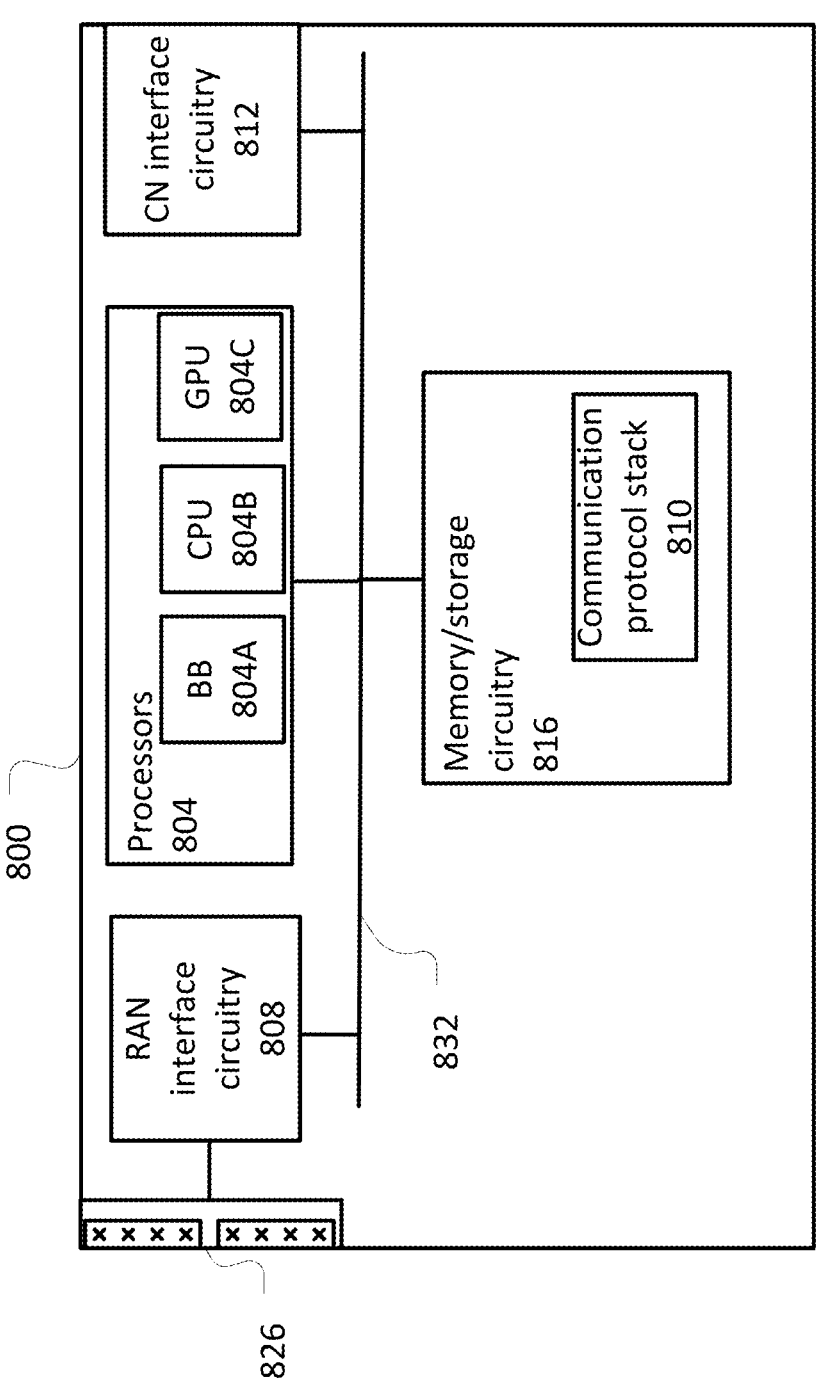
FIG. 8 illustrates a base station in accordance with some embodiments.

FIG. 8 illustrates an example base station 800 in accordance with some embodiments. The base station 800 may be a base station or an AMF as describe elsewhere herein. The base station 800 may include processors 804, RF interface circuitry 808, core network (CN) interface circuitry 812, memory/storage circuitry 816, and antenna structure 826. The RF interface circuitry 808 and antenna structure 826 may not be included when the base station 800 is an AMF.

The components of the base station 800 may be coupled with various other components over one or more interconnects 828.

The processors 804, RF interface circuitry 808, memory/storage circuitry 816 (including communication protocol stack 810), antenna structure 826, and interconnects 832 may be similar to like-named elements shown and described with respect to FIG. 7.

The CN interface circuitry 812 may provide connectivity to a core network, for example, a 5th Generation Core network (5GC) using a 5GC-compatible network interface protocol such as carrier Ethernet protocols, or some other suitable protocol. Network connectivity may be provided to/from the base station 800 via a fiber optic or wireless backhaul. The CN interface circuitry 812 may include one or more dedicated processors or FPGAs to communicate using one or more of the aforementioned protocols. In some implementations, the CN interface circuitry 812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: processing first protocol data unit (PDU) sets of a traffic flow based on a first PDU-set discarding state: processing second PDU sets of the traffic flow based on a second PDU-set discarding state: detecting a trigger event: switching, based on detecting the trigger event: from processing first PDU sets based on the first PDU-set discarding state to processing second PDU sets based on the second PDU-set discarding state: or from processing second PDU sets based on the second PDU-set discarding state to processing first PDU sets based on the first PDU-set discarding state.

Example 2 includes the method of example 1 or some other example herein, wherein: processing first PDU sets based on the first PDU-set discarding state comprises discarding PDU sets of the first PDU sets determined to have one or more PDUs lost; and processing second PDU sets based on the second PDU-set discarding state comprises continuing to transmit PDUs of PDU sets of the second PDU sets determined to have one or more PDUs lost.

Example 3 includes the method of example 2 or some other example herein, wherein the UE is configured with the first PDU-set discarding state or the second PDU-set discarding state as an initial state.

Example 4 includes the method of example 1 or some other example herein, further comprising: receiving a media access control (MAC) control element (CE) from a network device; and detecting the trigger event based on said receiving the MAC CE.

Example 5 includes a method of example 4 some other example herein, wherein the first PDU-set discarding state and the second PDU-set discarding state are associated with a data radio bearer (DRB) and the MAC CE includes: a bit, associated with the DRB, to provide the trigger event.

Example 6 includes a method of example 5 or some other example herein, wherein the MAC CE includes a plurality of bits that are respectively associated with a plurality DRBs, wherein individual bits indicate a PDU-set discarding state on an associated DRB.

Example 7 includes a method of example 4 some other example herein, wherein the first PDU-set discarding state and the second PDU-set discarding state are associated with a data radio bearer (DRB) and the MAC CE includes: a DRB identifier corresponding to the DRB to provide the trigger event.

Example 8 includes the method of example 1 or some other example herein, wherein the first PDU-set discarding state and the second PDU-set discarding state are associated with a data radio bearer, a quality of service flow, or a logical channel.

Example 9 includes a method of example 1 or some other example herein, wherein processing first PDU sets based on the first PDU-set discarding state comprises: transmitting PDU sets of the first PDU sets determined to have a first importance level; and discarding PDU sets of the first PDU sets determined to have a second importance level and determined to have one or more PDUs lost, wherein the second importance level is less than the first importance level.

Example 10 includes a method of example 1 or some other example herein, wherein processing the first PDU sets based on the first PDU-set discarding state comprises: transmitting PDU sets of the first PDU sets determined to have a first importance level; and discarding one or more PDU sets of the first PDU sets determined to have a second importance level without attempting to transmit any PDUs of the one or more PDU sets, wherein the second importance level is less than the first importance level.

Example 11 includes a method of example 1 or some other example herein, wherein: processing the first PDU sets based on the first PDU-set discarding state comprises discarding PDU sets of the first PDU sets determined to have a number of PDUs that are lost greater than a first number; and processing the second PDU sets based on the second PDU-set discarding state comprises discarding PDU sets of the second PDU sets determined to have a number of PDUs that are lost greater than a second number, the first number different from the second number.

Example 12 includes a method of example 1 or some other example herein, wherein processing the first PDU sets based on the first PDU-set discarding state comprises: discarding PDU sets of the first PDU sets determined to have a first importance level and a number of PDUs that are lost greater than a first number; and discarding PDU sets of the first PDU sets determined to have a second importance level and a number of PDUs that are lost greater than a second number, the first number different from the second number and the second importance level less than the first importance level.

Example 13 includes a method of example 12 or some other example herein, wherein processing the second PDU sets based on the second PDU-set discarding state comprises: discarding PDU sets of the second PDU sets determined to have the first number of PDUs that are lost, wherein said discarding of PDU sets of the second PDU sets is irrespective of importance levels of discarded PDU sets.

Example 14 includes the method of example 1 or some other example herein, wherein: processing the first PDU sets based on the first PDU-set discarding state comprises: discarding PDU sets of the first PDU sets determined to reside in a buffer longer than a first predetermined length of time; and processing the second PDU sets based on the second PDU-set discarding state comprises: discarding PDU sets of the second PDU sets determined to reside in the buffer longer than a second predetermined length of time, the first predetermined length of time is different than the second predetermined length of time.

Example 15 includes the method of example 1 or some other example herein, wherein processing the first PDU sets based on the first PDU-set discarding state comprises: discarding PDU sets of the first PDU sets determined to have a first importance level and reside in a buffer longer than a first predetermined length of time; and discarding PDU sets of the first PDU sets determined to have a second importance level and reside in a buffer longer than a second predetermined length of time, the first predetermined length of time different from the second predetermined length of time and the second importance level less than the first importance level.

Example 16 includes a method of example 15 or some other example herein, wherein processing the second PDU sets based on the second PDU-set discarding state comprises: discarding PDU sets of the second PDU sets determined to reside in the buffer longer than the first predetermined length of time, wherein said discarding of PDU sets of the second PDU sets is irrespective of importance levels of discarded PDU sets.

Example 17 includes the method of example 1 or some other example herein, further comprising: transmitting, to a network device, user assistance information to indicate a preference for a PDU-set discarding configuration.

Example 18 includes the method of example 17 or some other example herein, wherein the preference for the PDU-set discarding configuration comprises: a preference to activate or deactivate PDU set discarding: a preference to apply a PDU-set discarding state: a preference to configure a trigger condition; or a preference to apply a discard timer value.

Example 19 includes a method of operating a network device, the method comprising: configuring a user equipment (UE) with a first protocol data unit (PDU)-set discarding state and a second PDU-set discarding state: detecting a trigger condition; and transmitting, to the UE, a command to switch from processing first PDU sets based on the first PDU-set discarding state to processing second PDU sets based on the second PDU-set discarding state: or from processing second PDU sets based on the second PDU-set discarding state to processing first PDU sets based on the first PDU-set discarding state.

Example 20 includes the method of example 19 or some other example herein, further comprising: configuring the first PDU-set discarding state or the second PDU-set discarding state as an initial state.

Example 21 includes a method of example 19 or some other example herein, wherein the first PDU-set discarding state and the second PDU-set discarding state are associated with a DRB and transmitting the command comprises: transmitting a media access control (MAC) control element (CE) with: an activation bit that is associated with the DRB; or an identifier of the DRB.

Example 22 includes the method of example 19 or some other example herein, further comprising: receiving, from the UE, user assistance information to indicate a preference for a PDU-set discarding configuration; and configuring the first PDU-set discarding state or the second PDU-set discarding state based on the preference for the PDU-set discarding configuration.

Example 23 includes the method of example 19 or some other example herein, further comprising: receiving, from the UE, user assistance information to indicate a preference for a PDU-set discarding configuration; and configuring the trigger condition based on the preference for the PDU-set discarding configuration.

Example 24 includes the method of example 19 or some other example herein, wherein the preference for the PDU-set discarding configuration comprises: a preference to activate or deactivate PDU set discarding: a preference to apply a PDU-set discarding state: a preference to configure a trigger condition: or a preference to apply a discard timer value.

Another example may include an apparatus comprising means to perform one or more elements of a method described in or related to any of examples 1-24, or any other method or process described herein.

Another example may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Another example may include an apparatus comprising logic, modules, or circuitry to perform one or more elements of a method described in or related to any of examples 1-24, or any other method or process described herein.

Another example may include a method, technique, or process as described in or related to any of examples 1-24, or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-24, or portions thereof.

Another example may include a signal as described in or related to any of examples 1-24, or portions or parts thereof.

Another example may include a datagram, information element, packet, frame, segment, PDU, or message as described in or related to any of examples 1-24, or portions or parts thereof, or otherwise described in the present disclosure.

Another example may include a signal encoded with data as described in or related to any of examples 1-24, or portions or parts thereof, or otherwise described in the present disclosure.

Another example may include a signal encoded with a datagram, IE, packet, frame, segment, PDU, or message as described in or related to any of examples 1-24, or portions or parts thereof, or otherwise described in the present disclosure.

Another example may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Another example may include a computer program comprising instructions, wherein execution of the program by a processing element is to cause the processing element to carry out the method, techniques, or process as described in or related to any of examples 1-24, or portions thereof.

Another example may include a signal in a wireless network as shown and described herein.

Another example may include a method of communicating in a wireless network as shown and described herein.

Another example may include a system for providing wireless communication as shown and described herein.

Another example may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   processing first protocol data unit (PDU) sets of a traffic flow based on a first PDU-set discarding state;
   processing second PDU sets of the traffic flow based on a second PDU-set discarding state;
   receiving a media access control (MAC) control element (CE) from a network device;
   detecting a trigger event based on the MAC CE; and
   switching, based on detecting the trigger event: from processing first PDU sets based on the first PDU-set discarding state to processing second PDU sets based on the second PDU-set discarding state; or from processing second PDU sets based on the second PDU-set discarding state to processing first PDU sets based on the first PDU-set discarding state.

2. The method of claim 1, wherein:
   processing first PDU sets based on the first PDU-set discarding state comprises discarding PDU sets of the first PDU sets determined to have one or more PDUs lost; and
   processing second PDU sets based on the second PDU-set discarding state comprises continuing to transmit PDUs of PDU sets of the second PDU sets determined to have one or more PDUs lost.

3. The method of claim 2, wherein the first PDU-set discarding state or the second PDU-set discarding state is configured as an initial state.

4. The method of claim 1, wherein the first PDU-set discarding state and the second PDU-set discarding state are associated with a data radio bearer (DRB) and the MAC CE includes: a bit, associated with the DRB, to provide the trigger event.

5. The method of claim 4, wherein the MAC CE includes a plurality of bits that are respectively associated with a plurality of DRBs, wherein individual bits indicate a PDU-set discarding state on an associated DRB.

6. The method of claim 1, wherein processing first PDU sets based on the first PDU-set discarding state comprises:

transmitting PDU sets of the first PDU sets determined to have a first importance level; and discarding PDU sets of the first PDU sets determined to have a second importance level and determined to have one or more PDUs lost, wherein the second importance level is less than the first importance level.

7. The method of claim 1, wherein processing the first PDU sets based on the first PDU-set discarding state comprises:

transmitting PDU sets of the first PDU sets determined to have a first importance level; and discarding one or more PDU sets of the first PDU sets determined to have a second importance level without attempting to transmit any PDUs of the one or more PDU sets, wherein the second importance level is less than the first importance level.

8. The method of claim 1, wherein:

processing the first PDU sets based on the first PDU-set discarding state comprises discarding PDU sets of the first PDU sets determined to have a number of PDUs that are lost greater than a first number; and processing the second PDU sets based on the second PDU-set discarding state comprises discarding PDU sets of the second PDU sets determined to have a number of PDUs that are lost greater than a second number, the first number different from the second number.

9. The method of claim 1, wherein:

processing the first PDU sets based on the first PDU-set discarding state comprises:

discarding PDU sets of the first PDU sets determined to have a first importance level and a number of PDUs that are lost greater than a first number; and discarding PDU sets of the first PDU sets determined to have a second importance level and a number of PDUs that are lost greater than a second number, the first number different from the second number and the second importance level less than the first importance level; and processing the second PDU sets based on the second PDU-set discarding state comprises:

discarding PDU sets of the second PDU sets determined to have the first number of PDUs that are lost, wherein said discarding of PDU sets of the second PDU sets is irrespective of importance levels of discarded PDU sets.

10. The method of claim 1, wherein:

processing the first PDU sets based on the first PDU-set discarding state comprises: discarding PDU sets of the first PDU sets determined to reside in a buffer longer than a first predetermined length of time; and processing the second PDU sets based on the second PDU-set discarding state comprises: discarding PDU sets of the second PDU sets determined to reside in the buffer longer than a second predetermined length of time, the first predetermined length of time is different than the second predetermined length of time.

11. An apparatus comprising:

processing circuitry to:

generate a media access control (MAC) control element (CE) with a command to switch a user equipment (UE) from a first protocol data unit (PDU)-set discarding state to a second PDU-set discarding state; and output the MAC CE for transmission to the UE; and interface circuitry coupled with the processing circuitry to enable communication.

12. The apparatus of claim 11, wherein the processing circuitry is further to:

generate information to configure the UE to use the first PDU-set discarding state or the second PDU-set discarding state as an initial state.

13. The apparatus of claim 11, wherein the first PDU-set discarding state and the second PDU-set discarding state are associated with a data radio bearer (DRB) and the command of the MAC CE includes: an activation bit that is associated with the DRB.

14. The apparatus of claim 13, wherein the MAC CE includes a plurality of activation bits that are respectively associated with a plurality of DRBs.

15. The apparatus of claim 11, wherein the processing circuitry is further to:

generate, for transmission to the UE, information to configure the UE with the first PDU-set discarding state and the second PDU-set discarding state.

16. One or more non-transitory, computer-readable media having instructions that, when executed, cause processor circuitry to:

process first protocol data unit (PDU) sets of a traffic flow based on a first PDU-set discarding state;

process second PDU sets of the traffic flow based on a second PDU-set discarding state;

receive a media access control (MAC) control element (CE) from a network device;

detect a trigger event based on the MAC CE; and switch, based on the trigger event: from processing first PDU sets based on the first PDU-set discarding state to processing second PDU sets based on the second PDU-set discarding state; or from processing second PDU sets based on the second PDU-set discarding state to processing first PDU sets based on the first PDU-set discarding state.

17. The one or more non-transitory, computer-readable media of claim 16, wherein to:

process first PDU sets based on the first PDU-set discarding state the processor circuitry is to discard PDU sets of the first PDU sets determined to have one or more PDUs lost; and process second PDU sets based on the second PDU-set discarding state the processor circuitry is to continue to transmit PDUs of PDU sets of the second PDU sets determined to have one or more PDUs lost.

18. The one or more non-transitory, computer-readable media of claim 17, wherein the first PDU-set discarding state or the second PDU-set discarding state is configured as an initial state.

19. The one or more non-transitory, computer-readable media of claim 16, wherein the first PDU-set discarding state and the second PDU-set discarding state are associated with a data radio bearer (DRB) and the MAC CE includes: a bit, associated with the DRB, to provide the trigger event.

20. The one or more non-transitory, computer-readable media of claim 16, wherein the MAC CE includes a plurality of bits that are respectively associated with a plurality of DRBs, wherein individual bits indicate a PDU-set discarding state on an associated DRB.

* * * * *